(12) United States Patent
Ghosh et al.

(10) Patent No.: US 11,537,632 B2
(45) Date of Patent: Dec. 27, 2022

(54) METHOD AND SYSTEM FOR REAL-TIME DATABASE MONITORING

(71) Applicant: JPMorgan Chase Bank, N.A., New York, NY (US)

(72) Inventors: Debabrata Ghosh, Mckinney, TX (US); Noah Flaniken, Indianapolis, IN (US); Brian S. Elliott, Worthington, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 383 days.

(21) Appl. No.: 16/918,549

(22) Filed: Jul. 1, 2020

(65) Prior Publication Data

US 2022/0004563 A1    Jan. 6, 2022

(51) Int. Cl.

| | |
|---|---|
| G06F 16/20 | (2019.01) |
| G06F 16/27 | (2019.01) |
| G06F 11/30 | (2006.01) |
| G06N 7/00 | (2006.01) |
| G06N 20/00 | (2019.01) |
| G06F 11/34 | (2006.01) |

(52) U.S. Cl.
CPC ......... *G06F 16/273* (2019.01); *G06F 11/302* (2013.01); *G06F 11/3476* (2013.01); *G06N 7/00* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,202,964 | A * | 4/1993 | Crouch | H04Q 11/0407 714/E11.008 |
| 2014/0188740 | A1* | 7/2014 | Pearcy | G06F 16/113 705/315 |
| 2016/0350347 | A1* | 12/2016 | Das | G06F 16/258 |
| 2021/0101607 | A1* | 4/2021 | Du | B60W 50/04 |

* cited by examiner

*Primary Examiner* — Belix M Ortiz Ditren
(74) *Attorney, Agent, or Firm* — Greenblum & Bernstein, P.L.C.

(57) ABSTRACT

A method for facilitating real-time monitoring of changes in a database is provided. The method includes scanning a subsystem vector table for a database subsystem that is active on a logical partition; compiling a vector list that includes the active database subsystem; and dynamically generating, based on the vector list, a task for each of the active database subsystem. For each of the active database subsystem, the method further includes retrieving, from a module, a log that includes a parameter by executing the task; determining, by using a model, a deviation from an average operating state of the parameter based on the log; and determining whether the deviation meets a predetermined threshold for a predetermined period of time.

20 Claims, 5 Drawing Sheets

METHOD AND SYSTEM FOR REAL-TIME DATABASE MONITORING

BACKGROUND

1. Field of the Disclosure

This technology generally relates to methods and systems for database monitoring, and more particularly to methods and systems for facilitating real-time monitoring of changes in database subsystems by using statistical models and subsystem simulations.

2. Background Information

Many entities today implement complex database management systems such as, for example, IBM's Database 2 (Db2) data management solution to manage vast volumes of business data. These complex database management systems require implementation of equally complex monitoring tools to track changes across a vast enterprise database. Historically, use of such monitoring tools have resulted in varying degrees of success with respect to real-time monitoring of database subsystems.

One drawback of using conventional monitoring tools is that in many instances, the monitoring tools consume large amounts of processing resources from the database being monitored. As a result, operation of the monitoring tools on a database leads to performance degradation and processing inefficiencies for the database. In addition, conventional monitoring tools monitor high level database performance metrics, which do not adequately track and report changes occurring in database subsystems. This inadequate reporting results in ineffective monitoring of subsystem performance.

Therefore, there is a need for a tool that monitors database subsystems in real-time to track subsystem performance metrics and provide alerts when the performance metrics deviate from an average operating state.

SUMMARY

The present disclosure, through one or more of its various aspects, embodiments, and/or specific features or sub-components, provides, inter alia, various systems, servers, devices, methods, media, programs, and platforms for facilitating real-time monitoring of changes in database subsystems by using statistical models and subsystem simulations.

According to an aspect of the present disclosure, a method for facilitating real-time monitoring of changes in a database is provided. The method may be implemented by at least one processor. The method may include scanning at least one subsystem vector table for at least one database subsystem that is active on a logical partition; compiling at least one vector list that includes the at least one active database subsystem; and dynamically generating, based on the at least one vector list, at least one task for each of the at least one active database subsystem, wherein for each of the at least one active database subsystem, the method may further comprise retrieving, from at least one module, a log that includes at least one parameter by executing the at least one task; determining, by using at least one model, at least one deviation from an average operating state of the at least one parameter based on the log; and determining whether the at least one deviation meets a predetermined threshold for a predetermined period of time.

In accordance with an exemplary embodiment, when the at least one deviation meets the predetermined threshold for the predetermined period of time, the method may further include generating a report based on the at least one deviation; and displaying, via a graphical user interface, the report together with a notification.

In accordance with an exemplary embodiment, the method may further include determining, by using the at least one model, at least one future deviation based on the at least one deviation; and displaying, via a graphical user interface, the at least one future deviation.

In accordance with an exemplary embodiment, the method may further include determining, by using the at least one model, at least one future scenario that may relate to a distribution of a buffer pool resource based on the log and the at least one deviation; comparing the at least one future scenario to a current distribution of the buffer pool resource to determine a preferred buffer pool distribution setting; automatically updating a current buffer pool distribution setting with the preferred buffer pool distribution setting; and displaying, via a graphical user interface, the preferred buffer pool distribution setting together with a notification.

In accordance with an exemplary embodiment, the method may further include monitoring, via the at least one module, the at least one parameter in real-time; recording, via the at least one module, data relating to the at least one parameter; and storing, via the at least one module in a memory, the data in the log based on a predetermined schedule.

In accordance with an exemplary embodiment, the predetermined schedule may include at least one from among a periodic schedule and an episodic schedule, and the periodic schedule may include at least once every minute.

In accordance with an exemplary embodiment, the at least one parameter may include at least one from among a database configuration change, an activity performed under an administrative privilege, and a modification command.

In accordance with an exemplary embodiment, the database configuration change may include at least one from among a buffer pool modification, a group buffer pool modification, an active log modification, and a database storage modification.

In accordance with an exemplary embodiment, the at least one task may include at least one from among an asynchronous sub-task and a synchronous sub-task.

In accordance with an exemplary embodiment, the at least one model may include at least one statistical analysis model that is generated by using at least one machine learning technique.

According to an aspect of the present disclosure, a computing device configured to implement an execution of a method for facilitating real-time monitoring of changes in a database is disclosed. The computing device comprising a processor; a memory; and a communication interface coupled to each of the processor and the memory, wherein the processor may be configured to scan at least one subsystem vector table for at least one database subsystem that is active on a logical partition; compile at least one vector list that includes the at least one active database subsystem; and dynamically generate, based on the at least one vector list, at least one task for each of the at least one active database subsystem, wherein for each of the at least one active database subsystem, the processor may be further configured to retrieve, from at least one module via the communication interface, a log that includes at least one parameter by executing the at least one task; determine, by using at least one model, at least one deviation from an average operating state of the at least one parameter based on the log; and determine whether the at least one deviation meets a predetermined threshold for a predetermined period of time.

In accordance with an exemplary embodiment, when the at least one deviation meets the predetermined threshold for the predetermined period of time, the processor may be further configured to generate a report based on the at least one deviation; and display, via a graphical user interface, the report together with a notification.

In accordance with an exemplary embodiment, the processor may be further configured to determine, by using the at least one model, at least one future deviation based on the at least one deviation; and display, via a graphical user interface, the at least one future deviation.

In accordance with an exemplary embodiment, the processor may be further configured to determine, by using the at least one model, at least one future scenario that may relate to a distribution of a buffer pool resource based on the log and the at least one deviation; compare the at least one future scenario to a current distribution of the buffer pool resource to determine a preferred buffer pool distribution setting; automatically update a current buffer pool distribution setting with the preferred buffer pool distribution setting; and display, via a graphical user interface, the preferred buffer pool distribution setting together with a notification.

In accordance with an exemplary embodiment, the processor may be further configured to monitor, via the at least one module, the at least one parameter in real-time; record, via the at least one module, data relating to the at least one parameter; and store, via the at least one module in a module memory, the data in the log based on a predetermined schedule.

In accordance with an exemplary embodiment, the predetermined schedule may include at least one from among a periodic schedule and an episodic schedule, and the periodic schedule may include at least once every minute.

In accordance with an exemplary embodiment, the at least one parameter may include at least one from among a database configuration change, an activity performed under administrative privilege, and a modification command.

In accordance with an exemplary embodiment, the database configuration change may include at least one from among a buffer pool modification, a group buffer pool modification, an active log modification, and a database storage modification.

In accordance with an exemplary embodiment, the at least one task may include at least one from among an asynchronous sub-task and a synchronous sub-task.

In accordance with an exemplary embodiment, the at least one model may include at least one statistical analysis model that the processor may be further configured to generate by using at least one machine learning technique.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
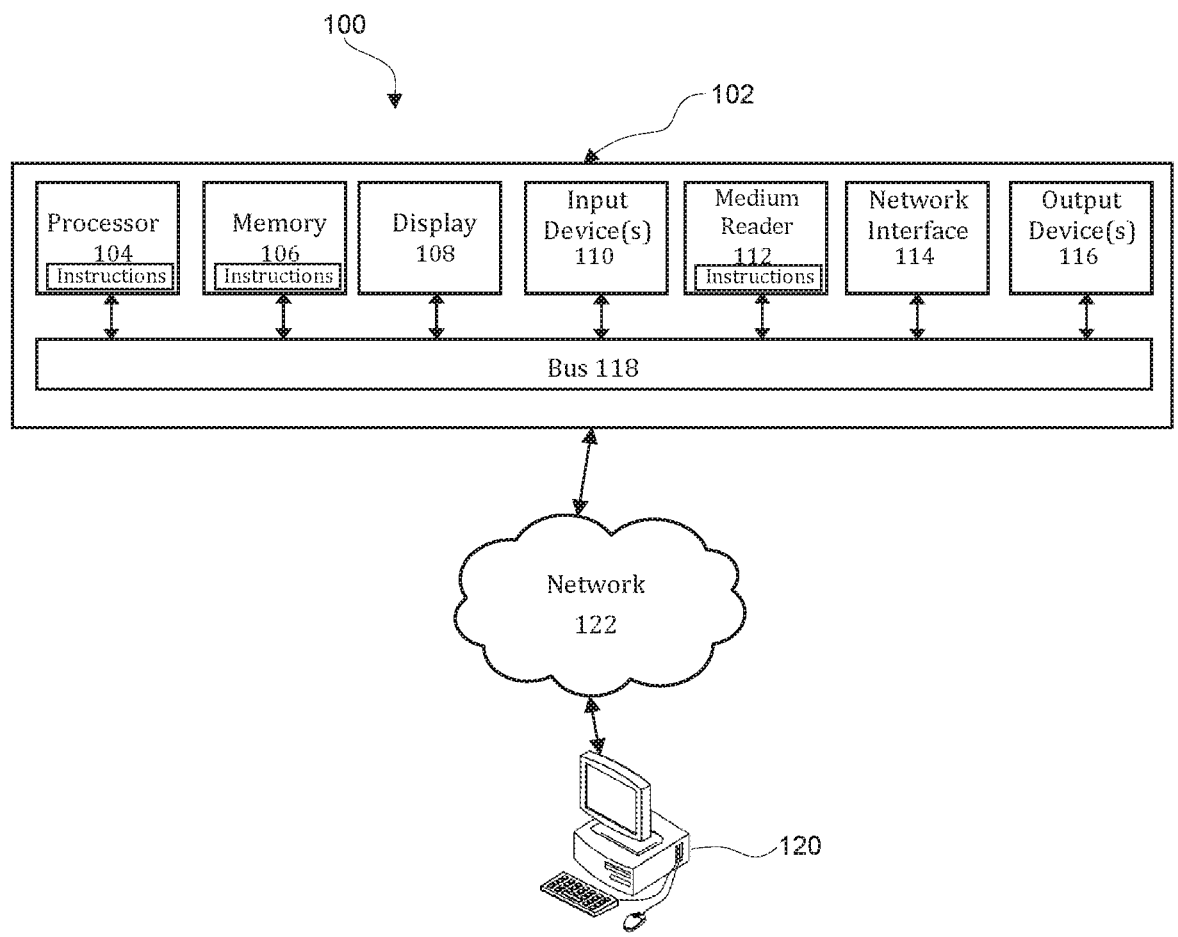
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The terra "system"shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support virtual processing environment.

As described herein, various embodiments provide optimized methods and systems for facilitating real-time monitoring of changes in database subsystems by using statistical models and subsystem simulations.

Figure 2:
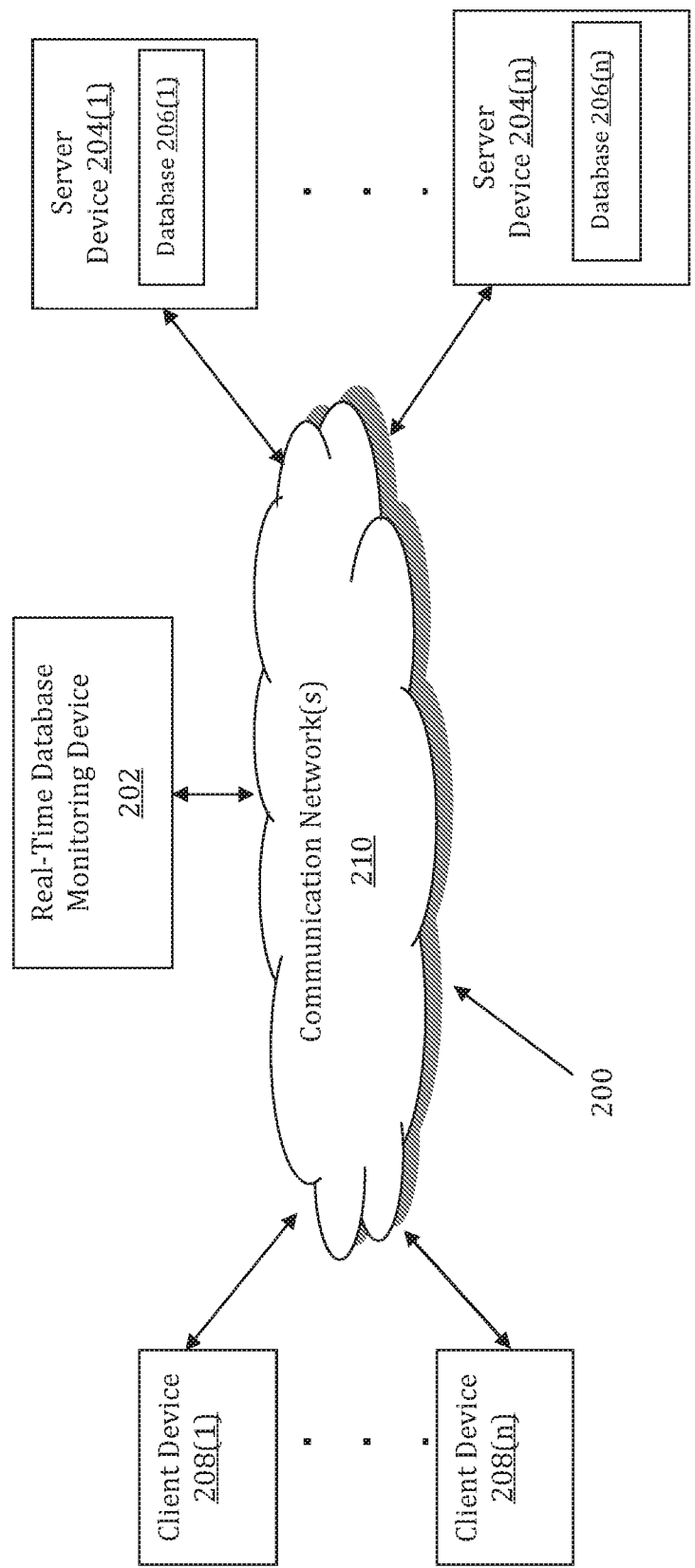
FIG. 2 illustrates an exemplary diagram of a network environment.

Referring to FIG. 2, a schematic of an exemplary network environment 200 for implementing a method for facilitating real-time monitoring of changes in database subsystems by using statistical models and subsystem simulations is illustrated. In an exemplary embodiment, the method is executable on any networked computer platform, such as, for example, a personal computer (PC).

The method for facilitating real-time monitoring of changes in database subsystems by using statistical models and subsystem simulations may be implemented by a Real-Time Database Monitoring (RTDM) device 202. The RTDM device 202 may be the same or similar to the computer system 102 as described with respect to FIG. 1. The RTDM device 202 may store one or more applications that can include executable instructions that, when executed by the RTDM device 202, cause the RTDM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RTDM device 202 itself, may be located in virtual server(s) running in a cloud-based computing environment rather than being tied to one or more specific physical network computing devices. Also, the application(s) may be running in one or more virtual machines (VMs) executing on the RTDM device 202. Additionally, in one or more embodiments of this technology, virtual machine(s) running on the RTDM device 202 may be managed or supervised by a hypervisor.

In the network environment 200 of FIG. 2, the RTDM device 202 is coupled to a plurality of server devices 204(1)-204(n) that hosts a plurality of databases 206(1)-206(n), and also to a plurality of client devices 208(1)-208(n) via communication network(s) 210. A communication interface of the RTDM device 202, such as the network interface 114 of the computer system 102 of FIG. 1, operatively couples and communicates between the RTDM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 12.2 as described with respect to FIG. 1, although the RTDM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and RTDM devices that efficiently implement a method for facilitating real-time monitoring of changes in database subsystems by using statistical models and subsystem simulations.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RTDM device 202 may be a standalone device or integrated with one or more other devices or apparatuses, such as one or more of the server devices 204(1)-204(n), for example. In one particular example, the RTDM device 202 may include or be hosted by one of the server devices 204(1)-204(n), and other arrangements are also possible. Moreover, one or more of the devices of the RTDM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RTDM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to subsystem vector tables, vector lists, generated tasks, retrieved logs, and statistical models.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the RTDM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the RTDM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the RTDM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RTDM device 202, the server devices 204(1)-204(n), or the client devices 208(1)-208(n), for example, may be configured to operate as virtual instances on the same physical machine. In other words, one or more of the RTDM device 202, the server devices 204(1)-204(n), or the client devices 208(1)-208(n) may operate on the same physical device rather than as separate devices communicating through communication network(s) 210. Additionally, there may be more or fewer RTDM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
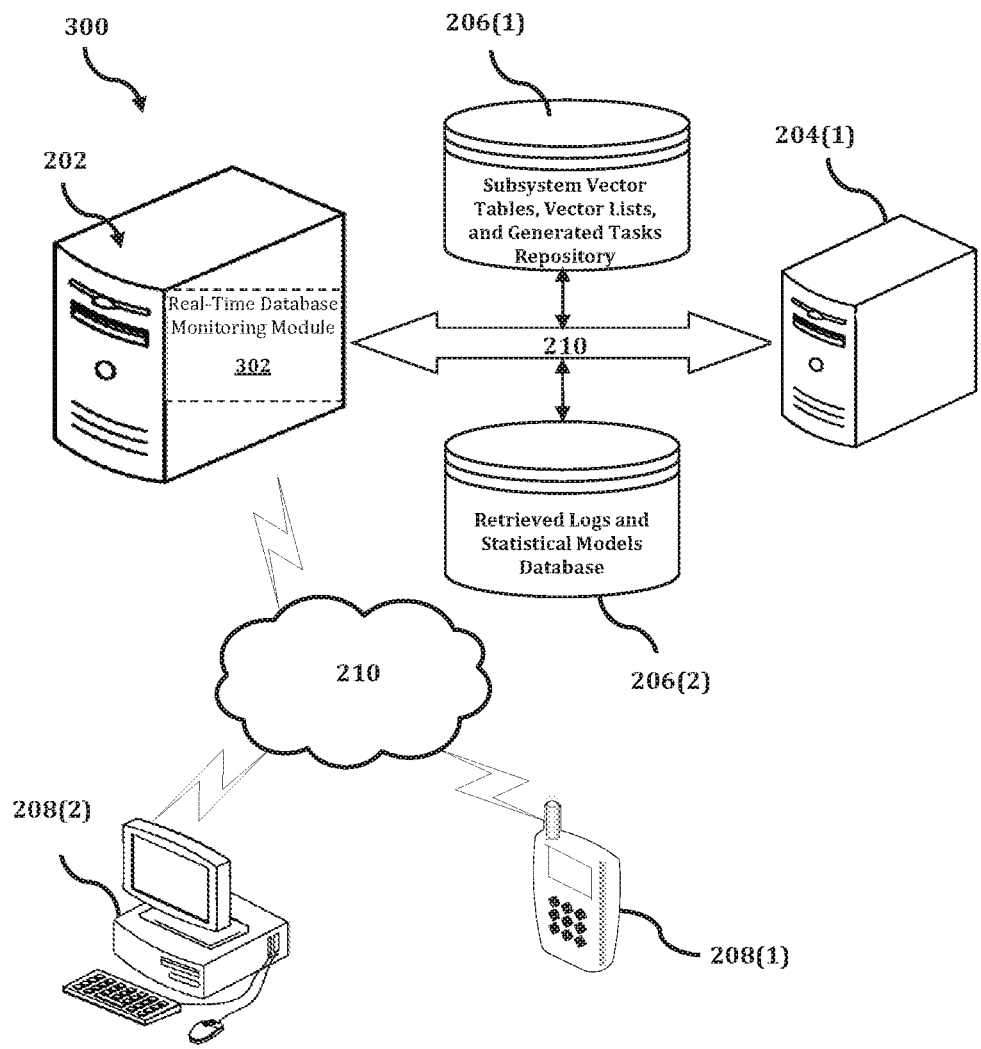
FIG. 3 shows an exemplary system for implementing a method for facilitating real-time monitoring of changes in database subsystems by using statistical models and subsystem simulations.

The RTDM device 202 is described and shown in FIG. 3 as including a real-time database monitoring module 302, although it may include other rules, policies, modules, databases, or applications, for example. As will be described below, the real-time database monitoring module 302 is configured to implement a method for facilitating real-time monitoring of changes in database subsystems by using statistical models and subsystem simulations.

An exemplary process 300 for implementing a mechanism for facilitating real-time monitoring of changes in database subsystems by using statistical models and subsystem simulations by utilizing the network environment of FIG. 2 is shown as being executed in FIG. 3. Specifically, a first client device 208(1) and a second client device 208(2) are illustrated as being in communication with RTDM device 202. In this regard, the first client device 208(1) and the second client device 208(2) may be "clients" of the RTDM device 202 and are described herein as such. Nevertheless, it is to be known and understood that the first client device 208(1) and/or the second client device 208(2) need not necessarily be "clients" of the RTDM device 202, or any entity described in association therewith herein. Any additional or alternative relationship may exist between either or both of the first client device 208(1) and the second client device 208(2) and the RTDM device 202, or no relationship may exist.

Further, RTDM device 202 is illustrated as being able to access a subsystem vector tables, vector lists, and generated tasks repository 206(1) and a retrieved logs and statistical models database 206(2). The real-time database monitoring module 302 may be configured to access these databases for implementing a method for facilitating real-time monitoring of changes in database subsystems by using statistical models and subsystem simulations.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the RTDM device 202 via broadband or cellular communication. Of course, these embodiments are merely exemplary and are not limiting or exhaustive.

Upon being started, the real-time database monitoring module 302 executes a process for facilitating real-time monitoring of changes in database subsystems by using statistical models and subsystem simulations. An exemplary process for facilitating real-time monitoring of changes in database subsystems by using statistical models and subsystem simulations is generally indicated at flowchart 400 in FIG. 4.

Figure 4:
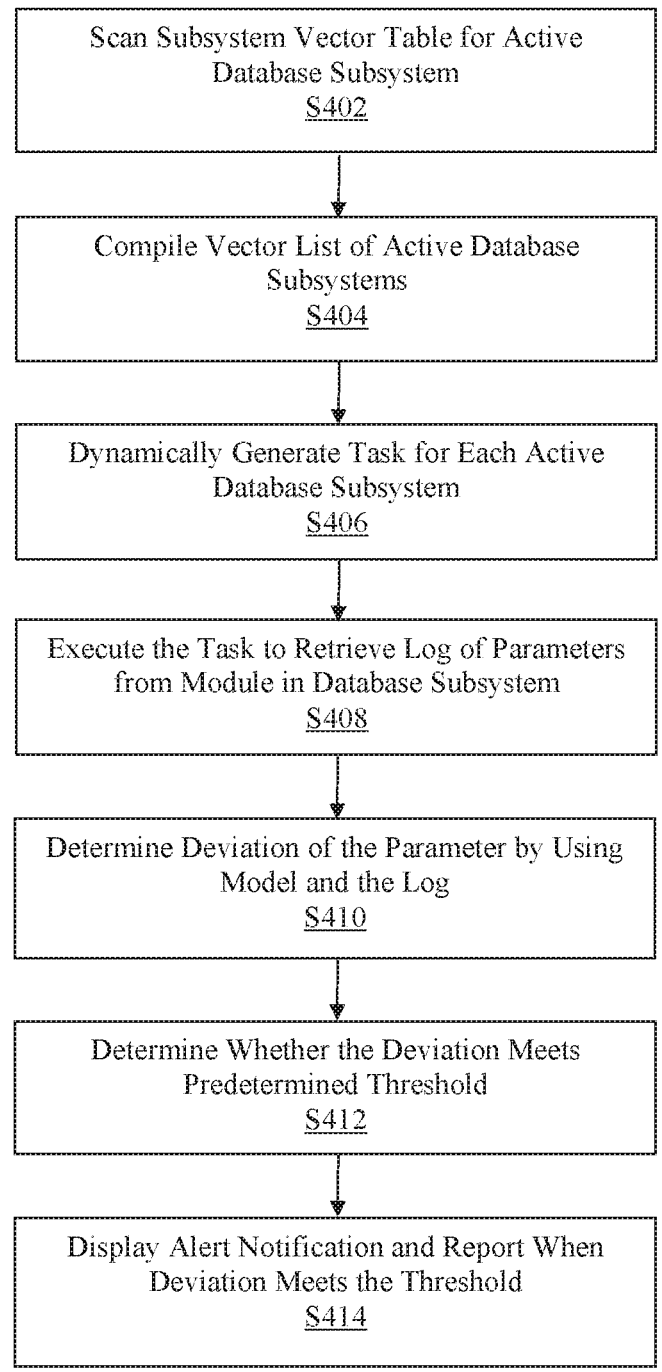
FIG. 4 is a flowchart of an exemplary process for implementing a method for facilitating real-time monitoring of changes in database subsystems by using statistical models and subsystem simulations.

In the process 400 of FIG. 4, at step S402, a subsystem vector table may be scanned for a database subsystem that is active on a logical partition. The database subsystem may include a secondary or subordinate system that may be capable of operating independently of, or asynchronously with, a controlling system. In an exemplary embodiment, the database subsystem ay include a distinct instance of a relational database management system such as, for example, Database 2 (Db2) for Z Series Operating System (z/OS), Microsoft Access, My Structured Query Language (MySQL), FileMaker, Oracle, Relational Database Management System (RDBMS), and Structured Query Language (SQL) Server. In another exemplary embodiment, the database subsystem may include software that controls the creation, organization, and modification of a database. The database subsystem software may also control access to the data that the database stores. As will be appreciated by a person of ordinary skill in the art, a database management system may include software packages designed to define, manipulate, retrieve, and manage data in a database via a database schema such as, for example, a hierarchical database schema, a network database schema, an object-oriented database schema, a graph database schema, a document database schema, as well as the relational database schema in the above exemplary embodiment.

In another exemplary embodiment, a subsystem vector table may include an implementation of a dynamically resizable array data structure in a database subsystem. The vector table may include sequence containers representing arrays that may change in size. In another exemplary embodiment, the vector table may utilize contiguous storage locations that may dynamically change in size. Management of the storage for the vector table may be handled automatically by the sequence containers. In another exemplary embodiment, the subsystem vector table may include information relating to database subsystems that are active on a logical partition. As will be appreciated by a person of ordinary skill in the art, the subsystem vector table may compile database subsystem data from the database management system.

In another exemplary embodiment, the subsystem vector table may be examined for data relating to a database subsystem by utilizing scanning techniques such as, for example, a sequential scanning technique and/or an index scanning technique. The sequential scanning technique may include reading each row of the table in sequential order for the desired data and validating encountered columns based on a validity condition. Similarly, the index scanning technique may include reading each index page from a clustered index and a non-clustered index for the desired data. In another exemplary embodiment, the subsystem vector table may be examined for data relating to a database subsystem by utilizing scanning techniques such as, for example, an index seek technique. The index seek technique may utilize a structure of a non-clustered index and a clustered index to find a single row or a specific subset of rows.

In another exemplary embodiment, the logical partition may include a subset of a computer's hardware resources that may be visualized as a separate computer. The logical partitions may be utilized to host multiple server environments within a single server unit. In another exemplary embodiment, computer software, computer firmware, and computer hardware systems such as, for example, a hypervisor and a virtual machine monitor may be used to create and run the logical partitions. As will be appreciated by a person of ordinary skill in the art, logical partitions in storage systems may enable multiple virtual instances of a storage array to exist within a single physical array.

At step S404, a vector list that includes the active database subsystem may be compiled. In an exemplary embodiment, a vector list may include an implementation of a dynamically resizable array data structure in a database subsystem. The vector list may include sequence containers representing arrays that may change in size. In another exemplary embodiment, the vector list may utilize contiguous storage locations that may dynamically change in size. Storage management for the vector list may be handled automatically by the sequence containers. In another exemplary embodiment, the vector list may be created and updated periodically, such as, for example, every minute, to include active database subsystems.

At step S406, a task may be dynamically generated based on the vector list for each of the active database subsystems. In an exemplary embodiment, the task may include a unit of work to be accomplished by the database subsystem. The task may also include sub-tasks such as, for example, an asynchronous sub-task and a synchronous sub-task. In another exemplary embodiment, the asynchronous sub-task may utilize asynchronous processing techniques to distribute the processing of a subsystem between connected systems. The asynchronous processing technique may transmit requests and replies on different sessions such that processing dependencies do not exist between a request and a reply, and no assumptions may be made about the timing of the reply. In another exemplary embodiment, the synchronous sub-task may utilize synchronous processing techniques to perform a unit of work. The synchronous processing technique may execute commands in a sequence such that a processing dependency exists between a request and a reply.

In another exemplary embodiment, the task may include one or more sequences of instructions created by a control program as an element of work to be accomplished by the database subsystem in a multiprocessing environment. The task may include a process that is created by another process such as, for example, a child task. In another exemplary embodiment, the task may be dynamically generated for each of the active database subsystems based on a predetermined standard such as, for example, on a per minute basis according to operating system standards. In another exemplary embodiment, the child task may include the asynchronous sub-task and the synchronous sub-task. The child task may operate on the database subsystem in real-time.

For each of the database subsystems, at step S408, a log that may include a parameter may be retrieved from a module by executing the generated task. In an exemplary embodiment, the log may include an electronic document such as, for example, a log file that records events which occur in a database subsystem. The log may include the electronic document itself as well as any corresponding metadata. In another exemplary embodiment, the recording of events in a log may be based on a predetermined schedule such as, for example, a periodic schedule and an episodic schedule. The periodic schedule may include a recording of events occurring in the database subsystem based on a regular maintenance schedule such as, for example, recording to the log once every minute. The episodic schedule may include a recording of events occurring in the database subsystem based on an unanticipated situation such as, for example, when the database subsystem has been compromised.

In another exemplary embodiment, the log may include a parameter relating to a characteristic of the database subsystem. The parameter may include numerical or other measurable factors that defines the database subsystem or sets the conditions for the operation of the database subsystem. In another exemplary embodiment, the parameter may include a database configuration change, an activity performed under administrative privilege, and a modification command. The database configuration change may further include a buffer pool modification, a group buffer pool modification, an active log modification, and a database storage modification. As will be appreciated by a person of ordinary skill in the art, the parameter may relate to a characteristic and change condition of the database subsystem.

In another exemplary embodiment, the module may include any of several distinct but interrelated processing units from which a program may be built. The module may also include processing units into which a complex activity may be analyzed. In another exemplary embodiment, the module may operate on each database subsystem to monitor the parameters in real-time. The module may monitor database subsystem resources such as, for example, central processing unit (CPU) consumption, operating system resources such as, for example, Z Series Operating System (z/OS) resources, database transactions, and nonsecure network connections from nonsecure ports. The module may record data relating to the parameter and store the data in the log based on a predetermined schedule. In another exemplary embodiment, the module may track activities in the database subsystem based on a user identification, a timestamp, and an Internet Protocol (IP) address.

At step S410, a deviation from an average operating state of the parameter based on the log may be determined by using a model. In an exemplary embodiment, the module may perform real-time statistical analysis on the logged data based on an average operating state of the parameter. The statistical analysis may compare the average operating state of the parameter to the logged data to determine a deviation of the parameter from an expected average. In another exemplary embodiment, the average operating state of the parameter may be determined automatically based on historical trends and predetermined baselines. In another exemplary embodiment, a model may be automatically generated based on the historical trend as a mathematical representation of the expected average operating state of the parameter. The model may be utilized to forecast a future deviation of the parameter based on the deviation and current configuration settings. In an exemplary embodiment, the future deviation and corresponding configuration settings may be displayed on a graphical user interface.

In another exemplary embodiment, the model may include a mathematical representation of a real-world process such as, for example, any one or more of a machine learning model, a statistical model, a mathematical model, a process model, and a data model. In another exemplary embodiment, the model may include training models such as, for example, a machine learning model which is designed to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and/or a bootstrap method determine that the training model's least squares error rate, true positive rate, true negative rate, false positive rate, and/or false negative rates are within predetermined ranges. In another exemplary embodiment, the training model may be operable, i.e., actively utilized by an organization, while continuing to be trained using new data. In another exemplary embodiment, the model may be generated using at least one from among an artificial neural network technique, a decision tree technique, a support vector machines technique, a Bayesian network technique, and a genetic algorithms technique.

At step S412, whether the deviation meets a predetermined threshold for a predetermined period of time may be determined. In an exemplary embodiment, the predetermined threshold and the predetermined period of time may include values automatically determined by the module based on the historical trends. The module may determine the predetermined threshold and the predetermined period of time by using the model to analyze the historical trends. In another exemplary embodiment, the predetermined threshold and the predetermined period of time may be manually set based on requirements such as, for example, a business policy and a governmental regulation.

At step S414, when the deviation meets the predetermined threshold for the predetermined period of time, a report may be generated based on the deviation and displayed together with a notification on a graphical user interface. In an exemplary embodiment, the report may include an electronic document that presents information in an organized format for a specific audience and purpose. The report may include visual representations of the information as well as textual representations of the information. In another exemplary embodiment, the report may be automatically generated when the deviation meets the predetermined threshold for the predetermined period of time.

In another exemplary embodiment, the report may be displayed together with a notification on a graphical user interface. The graphical user interface may include a visual form of interaction between a user and a computing device which incorporates graphical icons and audio indicators. The notification may include any one or more of a visual notification such as, for example, a textual notification on the user interface, an audible notification such as, for example, a sound played via speakers connected to a user device, and a tactile notification such as, for example, a vibration via a vibrating element of a user device. In another exemplary embodiment, the notification may include a textual notification on the user interface that may include information relating to the deviation. For example, the textual notification may include information relating to the deviation as well as the specific parameter upon which the deviation has been determined. In another exemplary embodiment, the textual notification may include, for example, selectable elements relating to disposition of the notification, selectable elements relating to a corrective action for the deviation, and selectable elements relating to authorization of the corrective action.

In another exemplary embodiment, a future scenario based on the log and the deviation that relates to a distribution of a buffer pool resource may be determined by using the model. The future scenario may include an operational situation based on a simulation of a specific buffer pool resource distribution. The operational situation may include a postulated sequence of events for the database subsystem relating to how much and where the buffer pool resource is distributed. For example, the postulated sequence of events may relate to simulated future deviations of the database subsystem based on a particular distribution of the buffer pool resources and a particular buffer pool configuration setting.

Then, the future scenario may be compared to a current distribution of the buffer pool resource to determine a preferred buffer pool distribution setting. For example, a future buffer pool distribution setting may be preferable over a current buffer pool distribution setting when deviations such as resource consumption in the future scenario are less than current deviations. Once the preferred buffer pool distribution setting has been determined, a current buffer pool distribution setting may be automatically updated with the preferred buffer pool distribution setting. The updating of the buffer pool distribution setting may be accomplished automatically without user intervention based on predetermined guidelines.

Finally, the preferred buffer pool distribution setting may be displayed on a graphical user interface together with a notification that the buffer pool setting has been updated. The preferred buffer pool distribution setting may also be displayed together with a record that includes information relating to the future scenario. For example, the record may be generated hourly and include information such as how much buffer pool resource may be saved by implementing the preferred buffer pool setting versus the current buffer pool setting.

Figure 5:
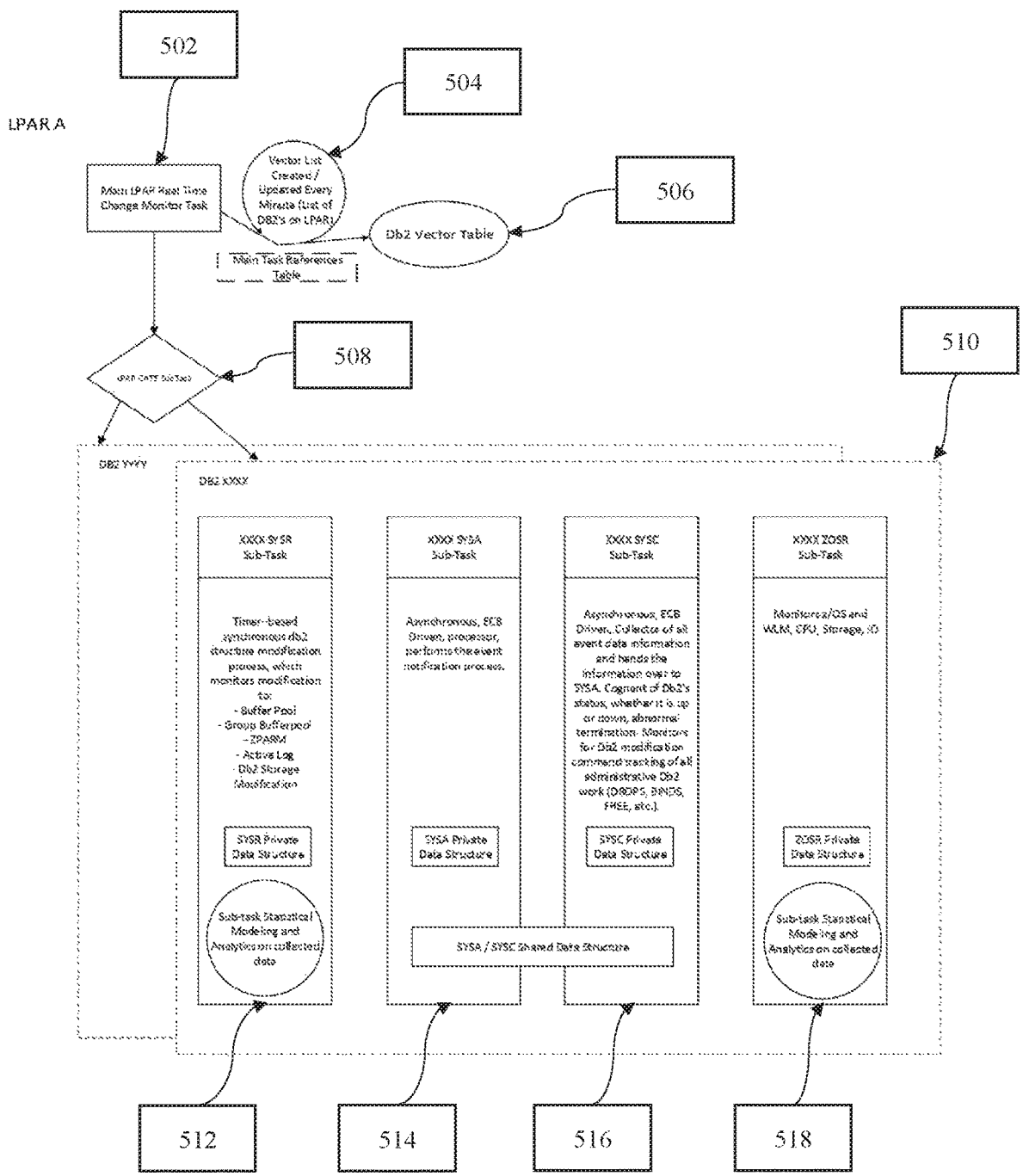
FIG. 5 is a diagram illustrating a database system that is usable for implementing a method for facilitating real-time monitoring of changes in database subsystems by using statistical models and subsystem simulations, according to an exemplary embodiment.

FIG. 5 is a diagram illustrating a database system that is usable for implementing a method for facilitating real-time monitoring of changes in database subsystems by using statistical models and subsystem simulations, according to an exemplary embodiment. The database system shown in FIG. 5 may be implemented on a logical partition titled "LPAR A."

As illustrated in FIG. 5, main task 502 represents a main real time change monitor task for the logical partition. Main task 502 examines Db2 vector table 506 by using main task reference tables to seek relevant information corresponding to active database subsystem 510. In turn, main task 502 may create and update vector list 504 every minute based on the relevant information. Vector list 504 may include a list of the active database subsystems on a logical partition. Main task 502 may utilize logical partition gate subtask 508 to dynamically generate tasks for each of the active database systems in vector list 504.

Active database subsystem 510 may include synchronous sub-task 512 titled "SYSR Sub-Task," asynchronous sub-task 514 titled "SYSA Sub-Task," asynchronous sub-task 516 titled "SYSC Sub-Task," and operating system sub-task 518 titled "ZOSR Sub-Task." Synchronous sub-task 512 may include a timer-based synchronous Db2 structure modification process that monitor modifications made to a buffer pool, a group buffer pool, a Z series parameter (ZPARM), an active log, and a Db2 storage modification. Synchronous sub-task 512 may include a private data structure and may perform sub-task statistical modeling and analytics on collected data.

Asynchronous sub-task 514 may include an asynchronous, electronic codebook (ECB) driven, processor that performs the event notification process. Similarly, asynchronous sub-task 516 may include an asynchronous, ECB driven, collector of all event data information. The collector may hand the information to asynchronous sub-task 514 for event notification. The collector may also be cognizant of subsystem status such as, for example, an active status and a down status, and abnormal subsystem terminations. Asynchronous sub-task 516 monitors and tracks Db2 modification commands such as, for example, a DROP command that removes an object at the current server, for all administrative Db2 work. Asynchronous sub-task 514 and asynchronous sub-task 516 may include a shared private data structure.

Operating system sub-task 518 may monitor changes in Z series operating system (z/OS), workload manager (WLM), central processing unit (CPU), storage, and input/output (IO) for the subsystem. Operating system sub-task 518 may include a private data structure and may perform sub-task statistical modeling and analytics on collected data.

Accordingly, with this technology, an optimized process for facilitating real-time monitoring of changes in database subsystems by using statistical models and subsystem simulations is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein, Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may he minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may he directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating real-time monitoring of changes in a database, the method being implemented by at least one processor, the method comprising:

scanning, by the at least one processor, at least one subsystem vector table for at least one database subsystem that is active on a logical partition;

compiling, by the at least one processor, at least one vector list that includes the at least one active database subsystem; and dynamically generating, by the at least one processor based on the at least one vector list, at least one task for each of the at least one active database subsystem, wherein for each of the at least one active database subsystem, the method further comprises:

retrieving, by the at least one processor from least one module, a log that includes at least one parameter by executing the at least one task;

determining, by the at least one processor using at least one model, at least one deviation from an average operating state of the at least one parameter based on the log; and determining, by the at least one processor, whether the at least one deviation meets a predetermined threshold for a predetermined period of time.

2. The method of claim 1, wherein when the at least one deviation meets the predetermined threshold for the predetermined period of time, the method further comprises:

generating, by the at least one processor, a report based on the at least one deviation; and displaying, by the at least one processor via a graphical user interface, the report together with a notification.

3. The method of claim 1, further comprising:

determining, by the at least one processor using the at least one model, at least one future deviation based on the at least one deviation; and displaying, by the at least one processor via a graphical user interface, the at least one future deviation.

4. The method of claim 1, further comprising:

determining, by the at least one processor using the at least one model, at least one future scenario that relates to a distribution of a buffer pool resource based on the log and the at least one deviation;

comparing, by the at least one processor, the at least one future scenario to a current distribution of the buffer pool resource to determine a preferred buffer pool distribution setting;

automatically updating, by the at least one processor, a current buffer pool distribution setting with the preferred buffer pool distribution setting; and displaying, by the at least one processor via a graphical user interface, the preferred buffer pool distribution setting together with a notification.

5. The method of claim 1, further comprising:

monitoring, by the at least one processor via the at least one module, the at least one parameter in real-time;

recording, by the at least one processor via the at least one module, data relating to the at least one parameter; and storing, by the at least one processor via the at least one module in a memory, the data in the log based on a predetermined schedule.

6. The method of claim 5, wherein the predetermined schedule includes at least one from among a periodic schedule and an episodic schedule, the periodic schedule including at least once every minute.

7. The method of claim 1, wherein the at least one parameter includes at least one from among a database configuration change, an activity performed under an administrative privilege, and a modification command.

8. The method of claim 7, wherein the database configuration change includes at least one from among a buffer pool modification, a group buffer pool modification, an active log modification, and a database storage modification.

9. The method of claim 1, wherein the at least one task includes at least one from among an asynchronous sub-task and a synchronous sub-task.

10. The method of claim 1, wherein the at least one model includes at least one statistical analysis model that is generated by using at least one machine learning technique.

11. A computing device configured to implement an execution of a method for providing a proxy redirect to facilitate a storage of an object, the computing device comprising:
a processor;
a memory; and
a communication interface coupled to each of the processor and the memory,
wherein the processor is configured to:
scan at least one subsystem vector table for at least one database subsystem that is active on a logical partition;
compile at least one vector list that includes the at least one active database subsystem; and
dynamically generate, based on the at least one vector list, at least one task for each of the at least one active database subsystem,
wherein for each of the at least one active database subsystem, the processor is further configured to:
retrieve, from at least one module via the communication interface, a log that includes at least one parameter by executing the at least one task;
determine, by using at least one model, at least one deviation from an average operating state of the at least one parameter based on the log; and
determine whether the at least one deviation meets a predetermined threshold for a predetermined period of time.

12. The computing device of claim 11, wherein when the at least one deviation meets the predetermined threshold for the predetermined period of time, the processor is further configured to:
generate a report based on the at least one deviation; and
display, via a graphical user interface, the report together with a notification.

13. The computing device of claim 11, wherein the processor is further configured to:
determine, by using the at least one model, at least one future deviation based on the at least one deviation; and
display, via a graphical user interface, the at least one future deviation.

14. The computing device of claim 11, wherein the processor is further configured to:
determine, by using the at least one model, at least one future scenario that relates to a distribution of a buffer pool resource based on the log and the at least one deviation;
compare the at least one future scenario to a current distribution of the buffer pool resource to determine a preferred buffer pool distribution setting;
automatically update a current buffer pool distribution setting with the preferred buffer pool distribution setting; and
display, via a graphical user interface, the preferred buffer pool distribution setting together with a notification.

15. The computing device of claim 11, wherein the processor is further configured to:
monitor, via the at least one module, the at least one parameter in real-time;
record, via the at least one module, data relating to the at least one parameter; and
store, via the at least one module in a module memory, the data in the log based on a predetermined schedule.

16. The computing device of claim 15, wherein the predetermined schedule includes at least one from among a periodic schedule and an episodic schedule, the periodic schedule including at least once every minute.

17. The computing device of claim 11, wherein the at least one parameter includes at least one from among a database configuration change, an activity performed under administrative privilege, and a modification command.

18. The computing device of claim 17, wherein the database configuration change includes at least one from among a buffer pool modification, a group buffer pool modification, an active log modification, and a database storage modification.

19. The computing device of claim 11, wherein the at least one task includes at least one from among an asynchronous sub-task and a synchronous sub-task.

20. The computing device of claim 11, wherein the at least one model includes at least one statistical analysis model that the processor is configured to generate by using at least one machine learning technique.

* * * * *